United States Patent [19]
Hayashi et al.

[11] Patent Number: 5,817,218
[45] Date of Patent: Oct. 6, 1998

[54] GAS REACTOR USING A PLASMA FOR CRACKING OR SYNTHESIZING GASES

[75] Inventors: Yuji Hayashi; Masao Hiyane, both of Kawasaki; Hiroaki Ota, Yokohama, all of Japan

[73] Assignee: Fujitsu Limited, Kanagawa, Japan

[21] Appl. No.: 702,628

[22] PCT Filed: Dec. 28, 1995

[86] PCT No.: PCT/JP95/02767

§ 371 Date: Aug. 30, 1996

§ 102(e) Date: Aug. 30, 1996

[87] PCT Pub. No.: WO96/20783

PCT Pub. Date: Jul. 11, 1996

[30] Foreign Application Priority Data

Jan. 4, 1995 [JP] Japan .................................. 7-000102
May 31, 1995 [JP] Japan .................................. 7-134068

[51] Int. Cl.$^6$ ...................................................... H05F 3/00
[52] U.S. Cl. ...................... 204/164; 204/172; 315/111.21; 422/177
[58] Field of Search ....................... 134/1.1, 21; 204/164, 204/172; 315/111.21; 422/177

[56] References Cited

U.S. PATENT DOCUMENTS

| | | |
|---|---|---|
| 3,285,709 | 11/1966 | Ennarino et al. . |
| 3,957,392 | 5/1976 | Blackburn . |
| 4,098,578 | 7/1978 | Stanton . |
| 4,253,852 | 3/1981 | Adams . |
| 4,318,894 | 3/1982 | Hensel et al. . |
| 4,376,637 | 3/1983 | Yang . |
| 4,427,418 | 1/1984 | Kogiso et al. . |
| 4,717,806 | 1/1988 | Battey et al. . |
| 4,954,320 | 9/1990 | Birmingham et al. . |
| 5,098,671 | 3/1992 | Shiota . |
| 5,196,670 | 3/1993 | Mantei . |
| 5,492,678 | 2/1996 | Ota et al. . |

FOREIGN PATENT DOCUMENTS

| | | |
|---|---|---|
| 0 282 831 | 3/1988 | European Pat. Off. . |
| 3-204827 | 9/1991 | Japan . |
| 4-279179 | 10/1992 | Japan . |

*Primary Examiner*—Jeffrey Stucker
*Attorney, Agent, or Firm*—Armstrong, Westerman, Hattori, McLeland & Naughton

[57] ABSTRACT

The gas reactor 10 has a first gas inlet 32, a second gas inlet 34, a gas outlet 36, a rotatable plate 22 and stationary plate 20 opposed to this rotatable plate, wherein a gap 24 is formed between these plates. Catalysts 26, 28 are carried by these rotatable and stationary plates. The rotatable and stationary plates are connected to a power supply so that plasma 30 can be generated in the gap 24. In the gap 24, a chemical reaction is promoted by the catalyst and plasma, and further a turbulent gas flow is made by the action of the rotatable plate, so that the chemical reaction can be facilitated. In this way, the first gas passes through the first gas inlet 32 and flows into the gap 24, and the first gas is activated in the gap. The second gas is fed from the second inlet 34 onto the downstream side of the gap 24 and mixed and reacted with the activated first gas. In the gas reactor, it is possible to use a fan instead of the rotatable plate, that is, it is possible to adopt a fan type gas reactor.

40 Claims, 14 Drawing Sheets

Fig.9
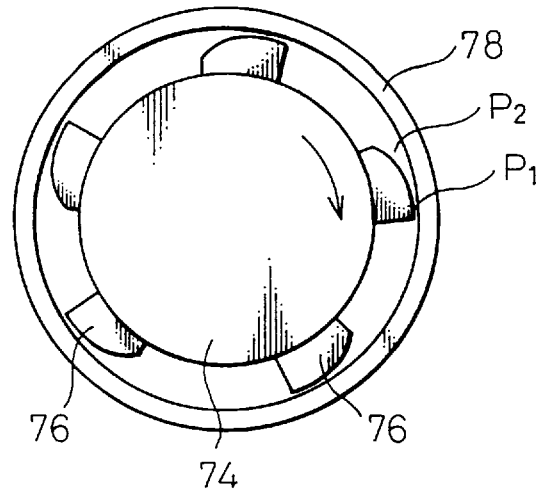
Fig.10
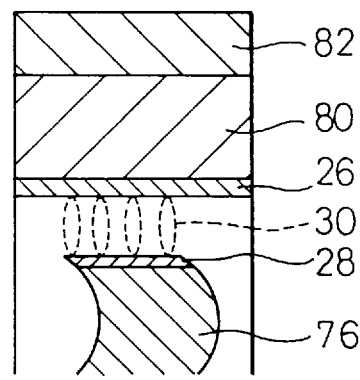
Fig.11A  Fig.11B  Fig.11C
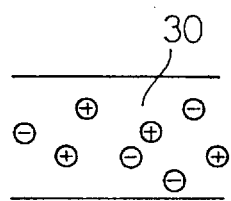 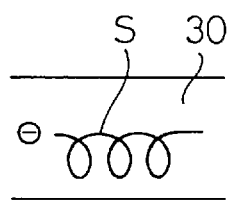 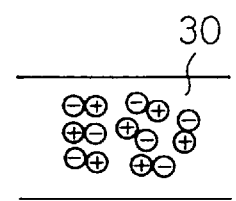

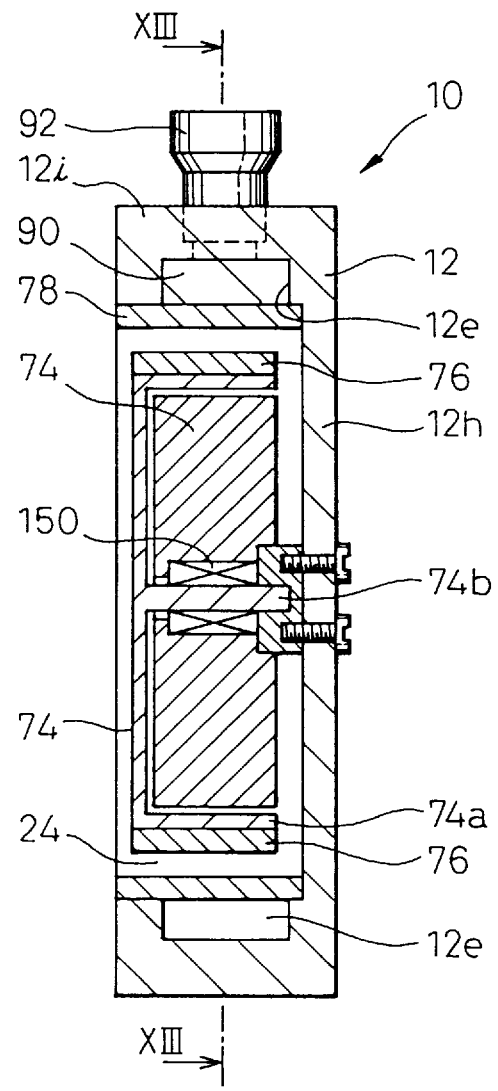

GAS REACTOR USING A PLASMA FOR CRACKING OR SYNTHESIZING GASES

TECHNICAL FIELD

The present invention relates to a gas reactor, and more particularly, relates to a gas reactor to effectively purify gas discharged from factories and automobiles and to crack or synthesize various types of gas. Further, the present invention relates to a method of gas reaction.

BACKGROUND ART

It is well known that harmful components contained in the exhaust gas discharged from factories and automobiles cause air pollution. Concerning countermeasures to prevent air pollution, large-scale countermeasures are taken to prevent air pollution caused by the exhaust gas discharged from factories. Further, various countermeasures are proposed such as a countermeasure to prevent air pollution caused by the exhaust gas discharged from automobiles. Examples of the effective countermeasures to purify the exhaust gas are a gas reactor in which a catalyst is used and a gas reactor in which plasma generated by electric discharge is used. In these gas reactors, the action of a catalyst and the action of plasma are separately used. Therefore, in some cases, these gas reactors can provide satisfactory effects to purify the exhaust gas, however, in other cases, it is not possible for these gas reactors to provide satisfactory effects when very severe requirements are imposed on the gas reactors.

In order to solve the above problems, there is proposed a gas purifying apparatus in which the action of a catalyst and the action of plasma are combined to enhance the effect of purifying gas, for example, a gas purifying apparatus is disclosed in Japanese Unexamined Patent Publication No. 6-262032. According to the technique disclosed in this unexamined patent publication, not only can the gas be purified by combining the action of a catalyst and the action of plasma but a gas reaction can also be conducted for other purposes. Concerning the gas reaction, it is relatively easy to conduct gas cracking, but it is relatively difficult to conduct gas synthesis. Accordingly, it is required to provide a gas reactor capable of conducting gas cracking or gas synthesis more effectively.

Further, Japanese Unexamined Patent Publication Nos. 6-262032 and 7-185266 disclose gas purifying apparatuses in which fins are attached to a rotational body. According to this technique, the action of a catalyst and the action of plasma are combined to enhance the effect of purifying gas. Further, when a turbulent flow is generated by the rotating fins in the gas to be treated, the performance of purifying the gas is improved. However, even this type gas purifying apparatus is not appropriate for cracking gas.

SUMMARY OF THE INVENTION

An object of the present invention is to provide a gas reactor capable of cracking and synthesizing various types of gas effectively.

The present invention is to provide a gas reactor comprising: a housing; a first member arranged in the housing; a second member arranged opposed to the first member so as to form a gap between the first member and the second member; a catalyst carried by at least one of the first member and the second member; a means for generating plasma in the gap between the first member and the second one; a first gas passage communicating from a first gas inlet provided in the housing to a gas outlet via the gap; and a second gas inlet provided in the housing for flowing gas to a position on the downstream side of the gap in the first gas passage.

In this gas reactor, when the first gas passes through the gap, it is reacted or activated by the action of plasma generated by the plasma generating means or the action of the catalyst. The second gas that has not passed through the gap is mixed with the activated first gas. Therefore, the first gas is more reacted with the second gas. In this way, decomposition or synthetic reaction of gas is effectively conducted.

It is preferable that the first member is rotatably arranged and the second member is stationarily arranged. Due to the foregoing arrangement, when the first gas passes through the gap, a turbulent flow is generated in the gas, so that the actions of plasma and catalyst can be enhanced.

It is preferable that the first member comprises a substantially flat rotatable plate, the second member comprises a substantially flat stationary plate, and the rotatable plate and the stationary plate are opposed to each other so that said gap is formed between them. Accordingly, even if the gap is relatively small, the rotatable plate and the stationary plate can provide a reaction region of large area.

It is preferable that the housing comprises a conductive portion and an insulating portion, the stationary plate is attached to the housing via the insulating portion, the stationary plate is provided with a terminal connected to one side of a power supply for generating plasma, and the rotatable plate is attached to the conductive portion of the housing, so that the rotatable plate is connected to the other side of the power supply via the conductive portion. When a voltage is applied between the rotatable plate and the stationary plate in this way, or preferably when an alternating voltage is applied between the rotatable plate and the stationary plate, it is possible to generate plasma.

It is preferable that the insulating portion comprises a cylindrical sleeve having Π-shape cross-section i.e. a cup-shaped cylindrical cross-section, a middle portion of the Π-shape, on cup shape, of the cylindrical sleeve is attached to the housing, and a leg portion of the Π-shape of the cylindrical sleeve is attached to the stationary plate. In this way, the rotatable plate and the stationary plate are electrically separated from each other. Therefore, a voltage can be impressed upon them.

It is preferable that the cylindrical sleeve divides an internal space of the housing into a central chamber inside the cylindrical sleeve and a peripheral chamber outside the cylindrical sleeve, the first inlet is provided in the cylindrical sleeve, the gas outlet is provided at a position in the housing close to the cylindrical sleeve, and the first gas passage is communicated from the first gas inlet to the gas outlet via the central chamber, the gap and the peripheral chamber. Due to the foregoing, the first gas flows from the centers of the rotatable plate and the stationary one to the periphery, and a uniform reaction is caused in the gap.

It is preferable that the housing comprises an annular wall, a first end wall and a second end wall, the first end wall and the second end wall are connected to both sides of the annular wall, the rotatable member is rotatably supported by a support means extending from the second end wall, and the opposing member is supported by an insulating support means extending from the first end wall.

It is preferable that the rotatable member includes a hollow hub portion, the support means for supporting the rotatable portion is a bearing to rotatably support the hollow portion of the hub, a shaft extending inside the hollow hub portion is fixed to the second end wall, and the insulating support means of the opposing member is engaged with the shaft.

The shaft includes a screw hole, the insulating support means of the opposing member includes a screw capable of engaging with the screw hole, so that a gap between the rotatable member and the opposing member can be adjusted. The opposing member is pushed by a spring with respect to the housing or a portion fixed to the housing.

It is preferable that the insulating support means for supporting the opposing member is composed of a cylindrical sleeve, the section of which is a Π-shape, engaged with a hole formed on the first end wall of the housing, the first gas inlet is provided in the cylindrical sleeve, the gas outlet is provided on the first end wall around the cylindrical sleeve, and the second gas inlet is provided on the annular wall of the housing.

It is preferable that the shaft extending inside the hollow hub portion is hollow, the first gas inlet is provided in the hollow shaft, the gas outlet is provided on the first end wall, and the second gas inlet is provided on the annular wall of the housing.

It is preferable that the gas reactor further comprises a drive means for driving the rotatable member. The gas reactor further comprises an adjusting means for adjusting a gap formed between the rotatable member and the opposing member when a state of reaction conducted in the gas reactor is detected.

The first member is preferably formed into a rotating body having fins. That is, the housing includes an inner circumferential wall, the second member is composed of an annular stationary member arranged on the inner circumferential wall of the housing, the first member is composed of a rotating body having fins in the periphery, and the stationary member and the fins of the rotating body are opposed to each other so as to form a gap between them. Also in this case, when the rotating body is rotated, a turbulent flow is generated in the first gas. Then the first gas is reacted or activated by the actions of plasma and catalyst in the gap between the stationary member and the fins of the rotating body. This activated first gas comes into contact with the second gas that has not passed through the gap and further reacts with the second gas. In this way, cracking of gas or synthetic reaction of gas can be effectively conducted.

It is preferable that the housing is made of conductive material, the annular stationary member is attached onto the inner circumferential wall of the housing via a layer made of insulating material, the annular stationary member has a terminal connected to one of the terminals of a power supply to generate plasma, and the rotating body is connected to the other terminal of the power supply via the housing. When a voltage is impressed between the fins of the rotating body and the stationary member in this way, it is possible to generate plasma.

In a preferable structure, the housing includes an annular wall, an end wall located on one side of the annular wall and an opening located on the other end side of the end wall, and the first gas inlet is composed of the opening on the other end side of the end wall, and the gas outlet is provided on the end wall, and the second gas inlet is provided on the annular wall.

In a preferable structure, the housing includes an annular wall, an end wall located on one side of the annular wall and an opening located on the other end side of the end wall, the rotating body is rotatably supported by a hollow shaft, and the first gas inlet is composed of an opening on the other end side, and the gas outlet is provided on the end wall, and the second gas inlet is provided in the hollow shaft.

It is preferable that the rotating body includes a gas flow changing member for changing a gas flow to the outside, wherein the gas flow changing member is arranged at a position on the upstream side of the gap in the first gas passage. The gas flow changing member is formed into a cone.

It is preferable that the inner circumferential wall of the housing is formed into a cylindrical shape, and the overall outer shape of the fins of the rotating body is formed into a shape to be accommodated on a predetermined cylindrical surface. In this case, the outer shapes of the fins of the rotating body are changed in the rotational direction i.e. the edges of the fins vary in shape.

It is preferable that a magnetic layer is provided outside the annular stationary member.

The rotating body is capable of rotating by the pressure of gas flowing in the first gas passage. The gas reactor further comprises a drive means for driving the rotatable member.

It is preferable that the housing includes a cooling means.

The present invention is to provide a method of reacting gas comprising the steps of: arranging a first member and a second member in a housing so that a gap can be formed between them, a catalyst being carried by at least one of the first member and the second member; generating plasma in the gap between the first member and the second one; letting the first gas flow from a first gas inlet provided in the housing into a first gas passage communicating with a gas outlet, via the gap, so that the first gas can be activated by the catalyst and plasma; and letting the second gas flow from a second gas inlet to a position located on the downstream side of the gap in the first gas passage, so that the activated first gas can be reacted with the second gas.

According to another characteristic of the present invention, it is possible to provide a gas reactor comprising: a housing; a substantially flat rotatable plate arranged in the housing; a substantially flat stationary plate arranged opposed to the rotatable plate so that a gap can be formed between the rotatable plate and the stationary plate; a catalyst carried by at least one of the rotatable plate and the stationary plate; a means for generating plasma in the gap between the rotatable plate and the stationary plate; a gas inlet provided in the housing; a gas outlet provided in the housing; and a gas passage communicating from the gas inlet to the gas outlet via the gap.

BRIEF DESCRIPTION OF THE DRAWINGS

These and other objects and advantages of the invention will be apparent from the ensuing description and drawings of embodiments in which:

FIG. 9 is a view showing a variation of the rotating body;

FIG. 10 is a view showing a variation in which a magnetic layer is provided;

FIGS. 11A to 11C are schematic illustrations for explaining the action of the magnetic layer shown in FIG. 10;

FIG. 12 is a cross-sectional view showing a gas reactor of the fifth embodiment of the present invention;

BEST MODE FOR CARRYING OUT THE INVENTION

Figure 1:
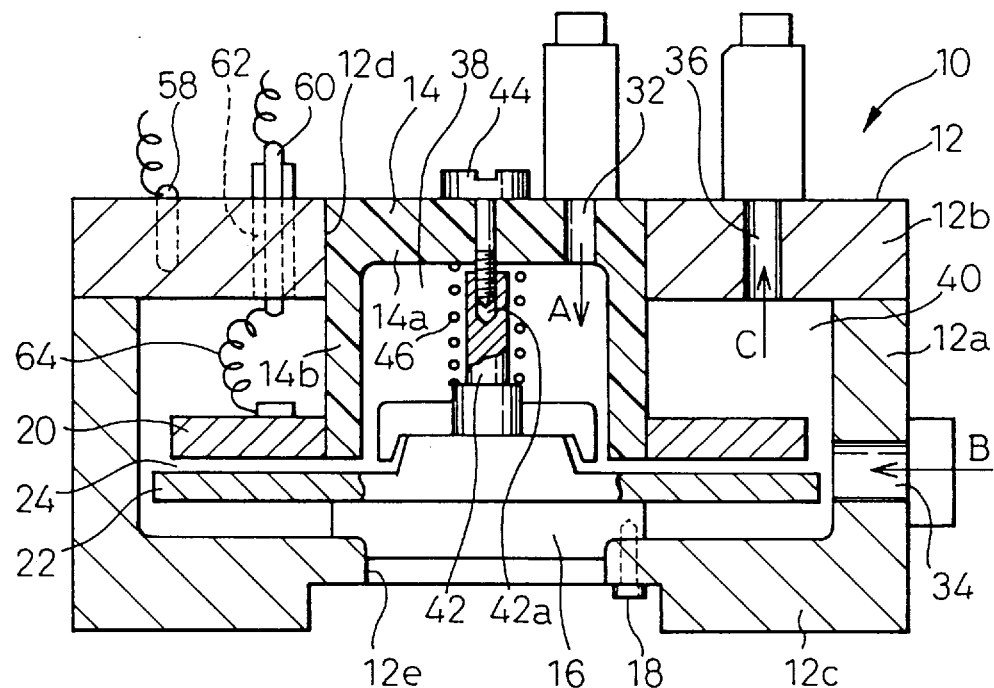
FIG. 1 is a cross-sectional view showing a gas reactor of the first embodiment of the present invention.
Figure 2:
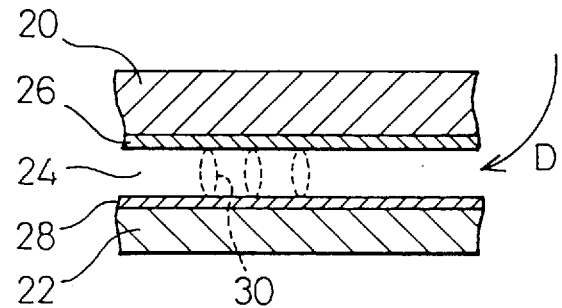
FIG. 2 is a partially enlarged view of the rotatable plate and the stationary plate shown in FIG. 1.
Figure 3:
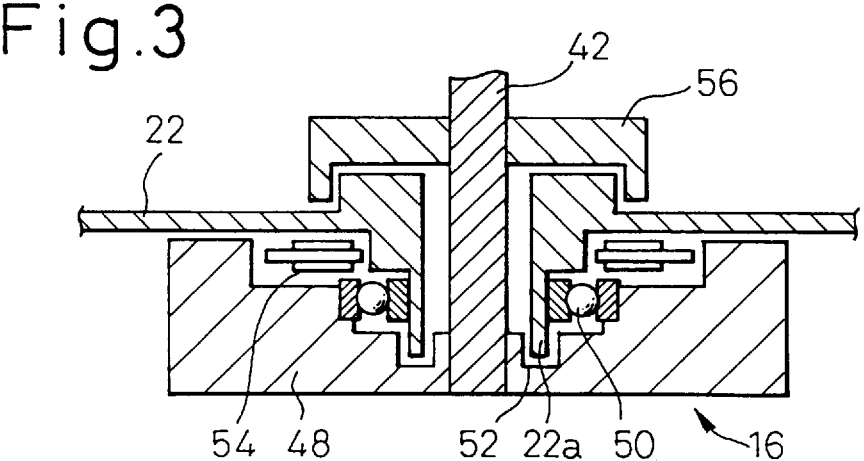
FIG. 3 is a detail view showing a motor assembly illustrated in FIG. 1.

FIGS. 1 to 3 are views showing the first embodiment of the present invention. The gas reactor 10 includes a housing 12, a rotatable member 22 arranged in the housing 12, and an opposing member 20 arranged opposed to the rotatable member 22 so that a gap 24 can be formed between the rotatable member 22 and the opposing member 20. In this embodiment, the rotatable member 22 comprises a substantially flat rotatable plate 22, and the opposing member 20 comprises a substantially flat stationary plate 20. The rotatable plate 22 and the stationary plate 20 are opposed to each other, so that the gap 24 is formed between them. The rotatable plate 22 and the stationary plate 20 provide a reaction region of large area, wherein the gap is relatively small.

The stationary plate 20 carries a catalyst layer 26, and the rotatable plate 22 carries a catalyst layer 28. The stationary plate 20 and the rotatable plate 22 are made of conductive metal, for example, stainless steel. When a voltage is impressed between the stationary plate 20 and the rotatable plate 22, plasma 30 is generated in the gap 24.

The housing 12 includes an annular wall 12a, a first end wall 12b, and a second end wall 12c, wherein the first end wall 12b and the second end wall 12c are connected to both sides of the annular wall. The first end wall 12b is manufactured separately from the housing 12 and other portions, and integrated into one body by screws not shown. At the center of the first end wall 12b, there is formed a circular hole 12d. At the center of the second end wall 12c, there is formed a circular hole 12e.

There is provided a cylindrical sleeve 14 having a Π-shape cross-section and made of an insulating plastic. This cylindrical sleeve 14 is engaged in the hole 12d in the first end wall 12b. This engagement is attained such that no liquid leaks from between the cylindrical sleeve 14 and the first end wall 12b, and the cylindrical sleeve 14 can be moved with respect to the first end wall 12b. The cylindrical sleeve 14 includes an end wall 14a located in the middle portion of the Π-shape, and a lag portion 14b. The end wall 14a is attached to the housing 12, that is, the end wall 14a is engaged with the hole 12d on the first end wall 12b. The leg portion 14b holds the stationary plate 20 in the housing 12. In this way, the rotatable plate 22 and the stationary plate 20 are electrically separated from each other, so that a voltage can be applied between them. The cylindrical sleeve 14 is an insulating portion of the first end wall 12b of the housing 12. Also, the cylindrical sleeve 14 is an insulating support means extending from the first end wall 12b.

The leg portion 14b of the cylindrical sleeve 14 protrudes into the housing 12, and makes it possible to adjust the gap 24. By the leg portion 14b of the cylindrical sleeve 14, the inner space of the housing 12 is divided into a central chamber 38 inside the cylindrical sleeve 14, and a peripheral chamber 40 outside the cylindrical sleeve 14.

The first gas inlet 32 is provided on the end wall 14a of the cylindrical sleeve 14. The second gas inlet 34 is provided in the annular wall 12a of the housing 12 at a position close to the gap 24. The gas outlet 36 is provided in the housing at a position close to the cylindrical sleeve 14. There is formed a first gas passage composed of the first gas inlet 32, the central chamber 38, the gap 24, the peripheral chamber 40 and the gas outlet 36. The first gas flows in the gap from the center of the rotatable plate 22 and the stationary plate 20 toward the periphery. Due to the foregoing, it is possible for the first gas to uniformly react in the gap 24. The gas outlet 36 is located outside the gap 24, that is, the gas outlet 36 is located on the downstream side of the gap 24 in the first gas passage.

The motor assembly 16 is fixed into the hole 12e on the end wall 12c of the housing 12 by screws 18. As shown in FIG. 3, the motor assembly 16 includes a support case 48 to be attached onto the second end wall 12c of the housing 12. The rotatable plate 22 has a hollow hub portion 22a, which is rotatably supported by the support case 48 via the bearing 50. There is formed a labyrinth seal 52 between the support case 48 and an end portion of the hollow hub portion 22a. Further, there is provided a coil 54 around the hollow hub portion 22a of the rotatable plate 22. Therefore, the coil 54 composes a linear motor in conjunction with the hollow hub portion 22a made of magnetic material.

The shaft 42 fixed to the support case 48 passes through the inside of the hollow hub portion 22a and penetrates the rotatable plate 22 as shown in FIG. 1 and extends toward the end wall 14a of the cylindrical sleeve 14. At the end of the shaft 42, there is provided a screw hole 42a. There is provided a screw 44 which passes through a hole formed in the end wall 14a of the cylindrical sleeve 14. When the screw 44 is engaged with the screw hole 42a, the cylindrical sleeve 14 is fixed at a position where a predetermined gap can be formed. There is provided a spring 46 between the end wall 14a of the cylindrical sleeve 14 and a stationary portion integrated with the shaft 42, so that the cylindrical sleeve 14 is pushed in a direction in which the cylindrical sleeve 14 can be pushed out from the end wall 12b of the housing 12. When the screw 44 is turned, the gap 24 can be adjusted. A cap 56 is attached to the support shaft 42. By this cap 56, the center of the rotatable plate 22 is sealed up, and the first gas is introduced into the gap 24.

A terminal 58 is attached onto the end wall 12b of the housing 12. This terminal 58 is connected to the negative side of a power source for generating plasma not shown in the drawing. Alternatively, this terminal 58 is connected to the ground. Consequently, the rotatable plate 22 is connected to the other side of the power source via the conductive housing 12. An insulating sleeve 62 penetrates the end wall 12b of the housing 12 and extends. The other terminal 60 passes through the insulating sleeve 62 and extends. An inner end portion of the terminal 60 is connected to the stationary plate 20 via a lead wire 64, and an outer end portion of the terminal 60 is connected to the other side of the power supply.

In the gas reactor 10 composed as described above, gas flows as follows. The first gas is fed from the first gas inlet 32 as shown by arrow A, and the second gas is fed from the second gas inlet 34 as shown by arrow B. The first gas and the second gas, which have reacted with each other, are discharged from the gas outlet 36 as shown by arrow C. When the first gas passes through the gap 24, a turbulent flow is caused in the first gas by the action of the rotatable plate 22. Then the first gas is reacted or activated by the action of plasma 30 generated by the plasma generating means 58, 62, 64 in the gap 24 or by the action of the catalysts 26, 28. The thus activated first gas comes into contact with the second gas which has been introduced from the second inlet and not passed in the gap 24. In accordance with the contact of the first gas with the second gas, the first gas further reacts with the second gas. In this way, not only the purification of gas but also cracking or synthetic reaction of gas can be effectively conducted. For example, the reaction of $2CH_4+O_2 \rightarrow 2CO+4H_2$ can be effectively conducted.

Moreover, it is possible to cause the reaction of $2CH_4 \rightarrow C_2H_4+2H_2$. In this case, when $CH_4$ is introduced from the first gas inlet 32 into the gap 24 and activated in the gap 24, this reaction can be stabilized.

Figure 16:
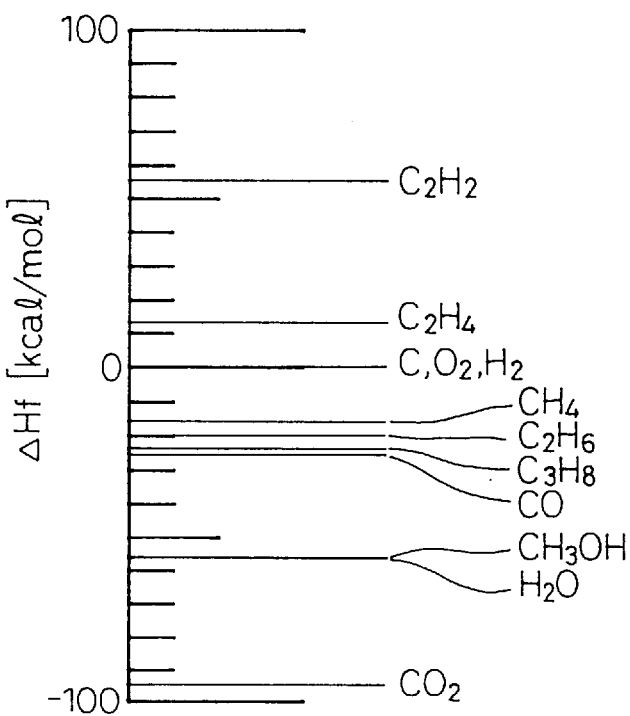
FIG. 16 is a view showing enthalpy of various types of gas.
Figure 17:
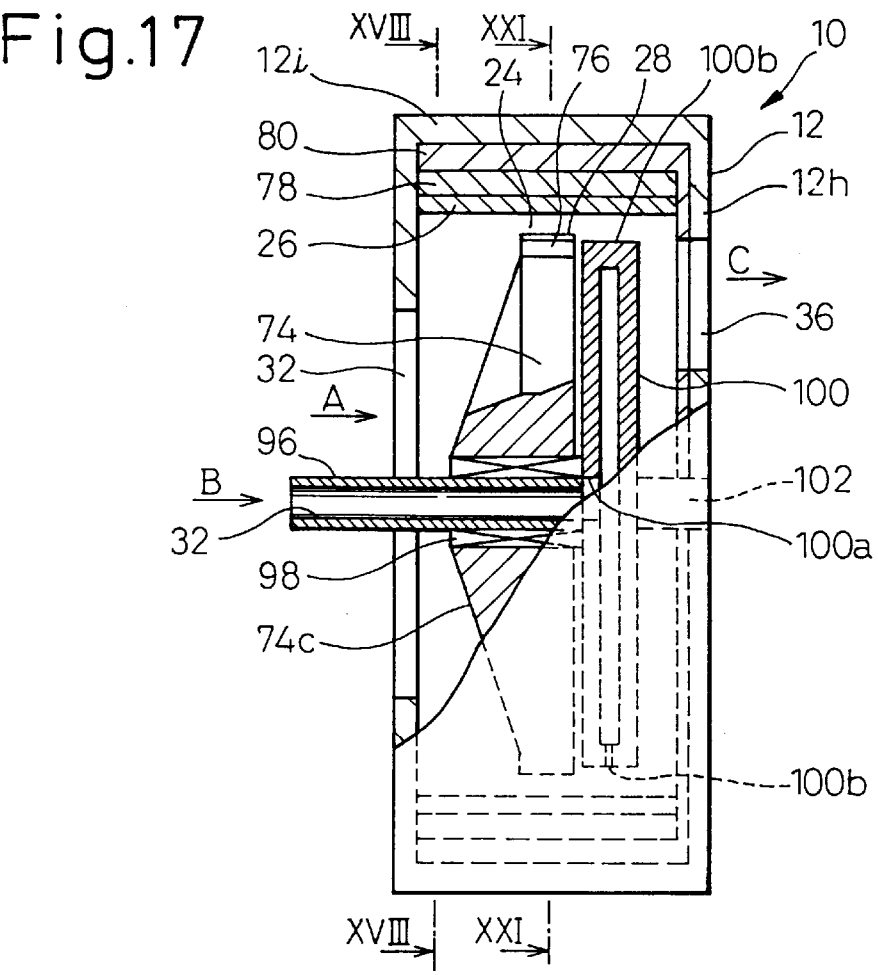
FIG. 17 is a cross-sectional view showing a gas reactor of the sixth embodiment of the present invention.
Figure 18:
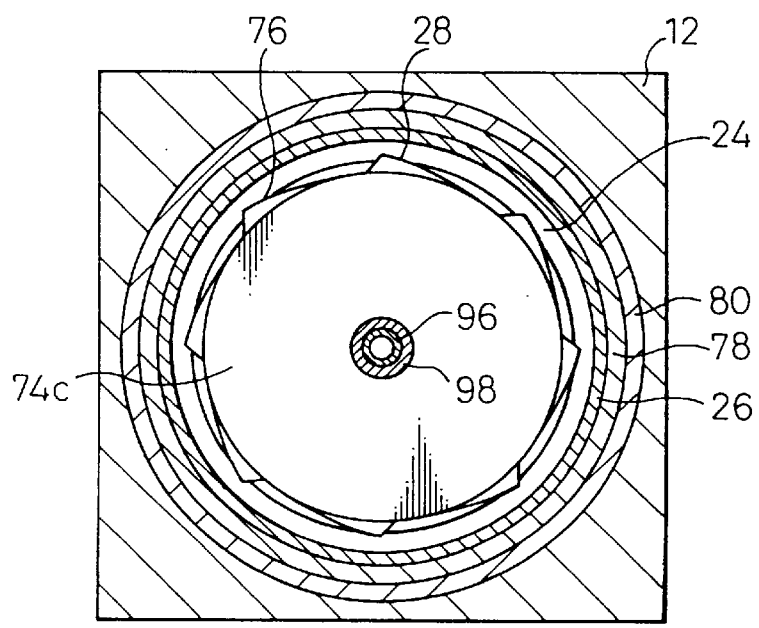
FIG. 18 is a cross-sectional view of the reactor taken on line XVIII—XVIII in FIG. 17.
Figure 19:
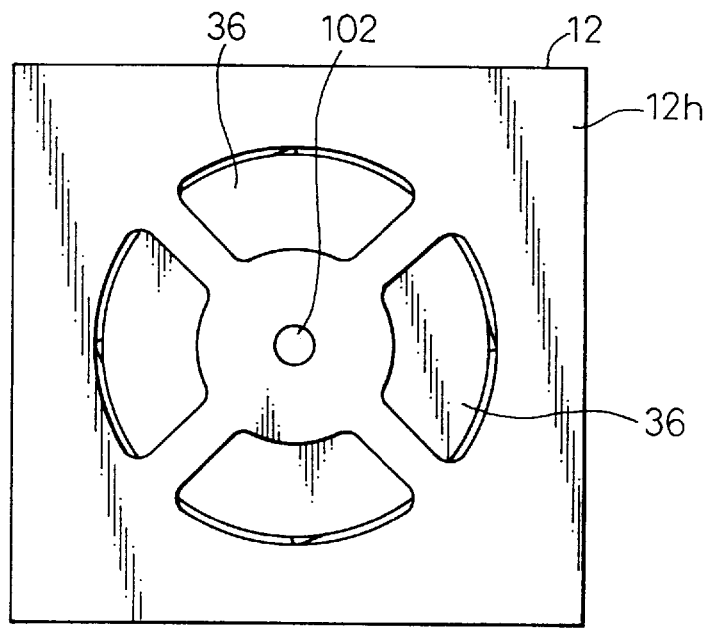
FIG. 19 is an end view showing one end side of the housing shown in FIG. 17.

FIG. 16 is a view showing the enthalpy ($\Delta Hf$) of various substances. It is relatively easy to cause a reaction in the direction of reducing the enthalpy ($\Delta Hf$) of a synthesized substance, however, it is relatively difficult to cause a reaction in the direction of increasing the enthalpy ($\Delta Hf$) of a synthesized substance. The above reaction to obtain ethylene ($C_2H_4$) from methane ($CH_4$) is a reaction in the direction of increasing the molecular weight of the synthesized substance. Usually, it is difficult to stably cause this reaction. However, according to the present invention, the first gas is activated by the action of a turbulent flow caused in the gap 24 and also by the action of plasma and catalyst, and the ionized molecules or atoms are energized from a ground state to a higher activated state. Due to the foregoing, the above reaction can be attained.

Examples of usable materials to compose the housing 12 are: metal, glass, ceramics, or functional polymer such as polyphenylene ether. However, since the stationary plate 20 and the rotatable plate 22 function as electrodes to generate plasma, it is preferable that the stationary plate 20 and the rotatable plate 22 are made of material having the properties of anticorrosion and conductivity, and especially it is preferable that the stationary plate 20 and the rotatable plate 22 are made of metal.

Plasma 30 is generated at a large number of small points in the gap 24. When the rotatable plate 22 composing the gap 24 is rotated, the positions at which plasma is generated are changed in accordance with the lapse of time, and plasma spreads all over the gap 24. Therefore, all the gas to be treated is subjected to the action of plasma. In order to generate plasma 30, either an alternating current or a direct current may be used, however, it is preferable to use an alternating current of 30 to 50 KHz.

Since the stationary plate 20 and the rotatable plate 22 function as electrodes to generate plasma, the catalyst layers 26, 28 provided on these plates 20, 22 are preferably made of conductive metal. Examples of usable metals having the catalyst action are transition metals such as iridium, chrome, cobalt, zirconium, cesium, tungsten, tantalum, titanium, iron, tellurium, niobium, nickel, platinum, vanadium, hafnium, palladium, manganese, molybdenum, ruthenium, rhenium, and rhodium. It is most preferable to use noble metals such as platinum, palladium, ruthenium, and rhodium.

It is possible to form these catalyst metal layers by means of electrical plating or chemical plating. Alternatively, it is possible to form the catalyst metal layer in such a manner that sheets of foil of catalyst metal are made to adhere onto the stationary plate 20 and the rotatable plate 22 with adhesive. When the catalyst metal layer is formed by means of plating, although it depends upon the type of metal, the catalyst metal layer can be formed under the condition that the temperature is in a range from room temperature to 50° C. and the time for plating is 2 hours. The thickness of the catalyst layer is not particularly limited, however, it is preferable that the thickness of the catalyst layer is approximately 3 to 10 $\mu$m. The above exemplary metals capable of conducting the catalyst action are effective when pollutants such as $NO_X$, which pollutes the atmosphere, are purified. Especially when $C_mH_n$ such as $CH_4$ and $C_2H_4$ is purified and reacted, palladium is very effective.

The catalyst layers 26, 28 are not necessarily composed of a single catalyst metal, but a plurality of catalyst metals may be combined to compose the catalyst layers, so that the gas purifying efficiency and the gas reacting efficiency can be enhanced. For example, it is possible to form the catalyst layers 26, 28 respectively from platinum and palladium under the condition that both platinum and palladium are exposed. It is also possible to attach a different catalyst onto the catalyst layers 26, 28. It is also possible to attach the catalyst onto one of the rotatable plate 22 and the stationary plate 20.

Figure 4:
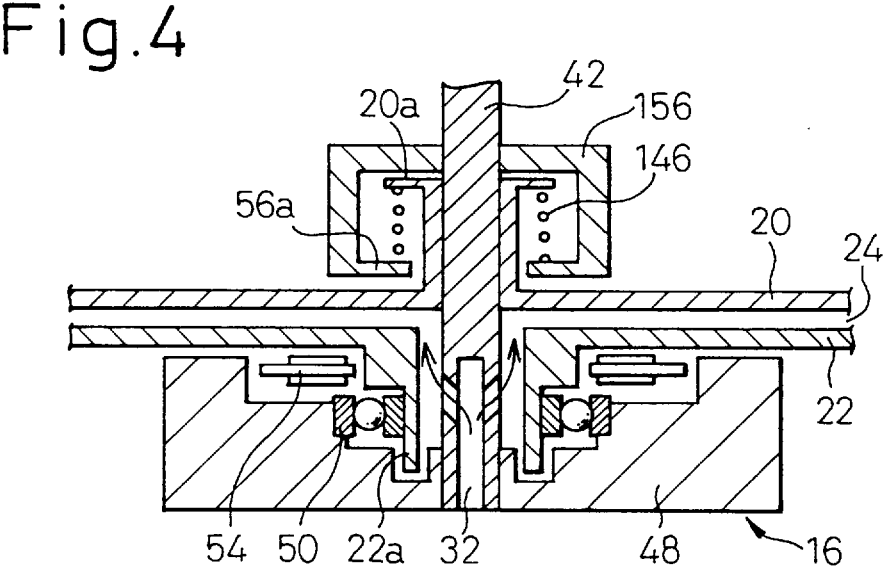
FIG. 4 is a cross-sectional view showing a gas reactor of the second embodiment of the present invention.

FIG. 4 is a view showing an arrangement of the second embodiment of the present invention. In this embodiment, the rotatable plate 22 includes a hollow hub portion 22a. This hollow hub portion 22a is supported by the support case 48 via the bearing 50. In the same manner as that of the above embodiment, the support case 48 is attached to the second end wall 12c of the housing 12. The support shaft 42 extends inside the hollows hub portion 22a of the rotatable plate 22. In this case, the support shaft 42 is made to be hollow.

The first gas inlet 32 and the first gas passage are formed by the hole made in the hollow support shaft 42. The hole of the hollow support shaft 42 is open to the outside of the support case 48 and ends at a position close to the gap 24 between the rotatable plate 22 and the stationary plate 20. The hole of the hollow support shaft 42 is connected to a transverse hole which penetrates the wall of the hollow support shaft 42, so that the first gas can flow from the hole into the gap 24 between the rotatable plate 22 and the stationary plate 20 as shown by the arrow in the drawing. In the same manner as that of the above embodiment, the second gas inlet is formed on the annular wall 12a of the housing 12, and the gas outlet is formed on the first end wall 12a of the housing 12. The stationary plate 20 is pushed by the spring 146 in this case, too.

Figure 5:
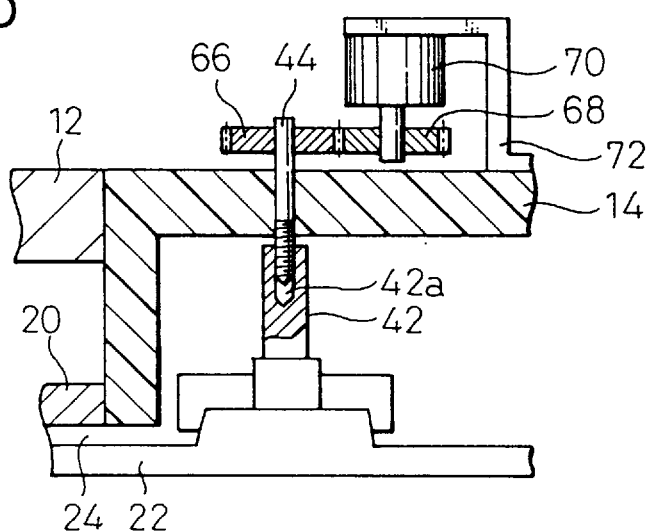
FIG. 5 is a cross-sectional view showing a gas reactor of the third embodiment of the present invention.

FIG. 5 is a view showing an arrangement of the third embodiment of the present invention. The housing 12, rotatable plate 22 and stationary plate 20 are arranged in the same manner as that of the first embodiment. The shaft 42 fixed to the support case 48 passes inside the hollow hub portion 22a and penetrates the rotatable plate 22 and extends to the end wall 14a of the cylindrical sleeve 14. At the end of the shaft 42, there is formed a screw hole 42a. When a screw 44 inserted through a hole formed on the end wall 14a is engaged with the screw hole 42a, the cylindrical sleeve 14 can be fixed at a position where a predetermined gap 24 can be formed. There is provided a spring 46 between the end wall 14a of the cylindrical sleeve 14 and a stationary portion integrated with the shaft 42, and the cylindrical sleeve 14 is pushed by the spring 46 in a direction in which the cylindrical sleeve 14 is pulled out from the end wall 12b of the housing 12.

In this embodiment, a gear 66 is attached to the screw 44, and a gear 68 attached to the output shaft of a motor 70 is meshed with this gear 66. The motor 70 is supported by the housing 12 via a stay 72. In this case, the cylindrical sleeve 14 is engaged in the hole 12d of the first end wall 12b in the following manner in such a manner that no fluid leaks from between the cylindrical sleeve 14 and the first end wall 12b and that the cylindrical sleeve 14 can be moved with respect to the first end wall 12b. Accordingly, the cylindrical sleeve 14 is capable of moving in the axial direction. When the screw 44 is turned by the motor 70, the stationary plate 20 is moved toward or away from the rotatable plate 22, so that the gap 24 can be adjusted.

In this embodiment, there is provided a detection means (not shown) for detecting the states of reaction of the first gas and the second one and also for detecting the state of gas at the outlet. In accordance with the state of reaction, which has been detected by the detecting means, a value of the gap 24 is subjected to feedback control. For example, when the first gas is methane generated from garbage, the purity is low, and the temperature and the ratio of composition are changed and not stabilized. Accordingly, when raw material such as garbage is used, it is difficult to control the reaction stably. However, according to the present embodiment, when the gap 24 is controlled in accordance with the state of product generated by the reaction, it is possible to control the reaction stably. In this connection, the control of the gap 24 described above can be applied to other embodiments.

Figure 6:
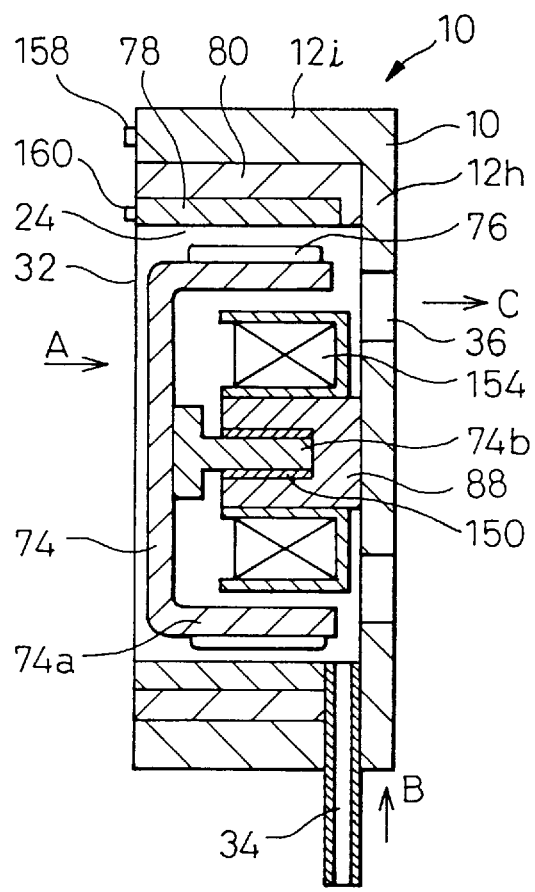
FIG. 6 is a cross-sectional view showing a gas reactor of the fourth embodiment of the present invention.
Figure 7:
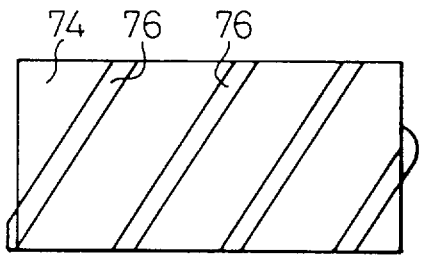
FIG. 7 is a front view of the rotating body shown in FIG. 6.
Figure 8:
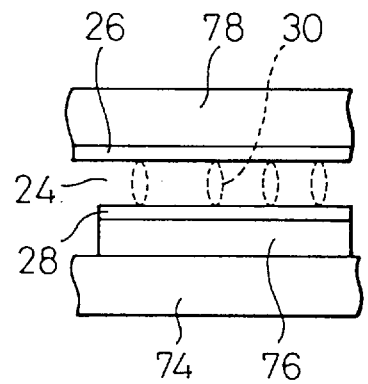
FIG. 8 is a partially enlarged view of the rotating body and the metallic ring shown in FIG. 7.

FIGS. 6 to 8 are views showing the fourth embodiment of the present invention. In the above embodiment, the rotatable plate 22 is used. On the other hand, in this embodiment, a fan type rotating body 74 is used. On the outer circumference of the rotating body 74, there are provided fins 76. The outer circumferential surface of the rotating body 74 is formed into a cylindrical surface, and the fins 76 are provided on the outer circumferential surface in such a manner that the fins 76 protrude from the surface in the radial direction. Outer shapes of the fins 76 are determined so that the height of the fins can be formed to be constant.

Therefore, the fins 76 are accommodated on a predetermined cylindrical surface. The section of each fin 76 is approximately rectangular, and each fin 76 extends diagonally with respect to the axis of the rotating body 74. However, each fin 76 may be formed in such a manner that the fin extends in parallel with the axis of the rotating body 74.

The gas reactor 10 includes a conductive housing 12. The conductive housing 12 includes an end wall 12h and an annular circumferential wall 12i. On the annular circumferential wall 12i, there is provided a metallic ring 78 which functions as an opposing member or an annular stationary member. The fins 76 of the rotating body 74 is opposed to the metallic ring 78, and a gap 24 is formed between them. There is provided an insulating ring 80 between the metallic ring 78 and the end wall 12h of the housing 12 and also between the metallic ring 78 and the inner circumferential wall 12i of the housing 12. Terminals 158 and 160, which are connected to a power supply used for the generation of plasma, are respectively arranged in the housing 12 and the metallic ring 78. Accordingly, when a voltage is impressed between the fins 76 of the rotational body 74 and the metallic ring 78, plasma 30 can be generated in the gap 24. Further, there is provided a catalyst layer 26 on the metallic ring 78, and also there is provided a catalyst layer 28 on the fins 76 of the rotating body 74. The catalyst layers 26, 28 can be made of a material described before.

On the end wall 12h of the housing 12, there are provided a bearing 150 and a motor coil 154, and a shaft 74b of the rotating body 74 is rotatably supported by the bearing 150. The rotating body 74 is made of magnetic material and rotated by the magnetic force generated by the coil 154.

A side of the housing 12 opposite to the end wall 12h is open, and this opening portion functions as the first gas inlet 32. In this connection, an end wall may be arranged on the side opposite to the end wall 12h, and an opening may be formed on this side. The second gas inlet 34 is arranged on the annular inner circumferential wall 12i, and the gas outlet 36 is arranged on the end wall 12h. Accordingly, the first gas flows in the first gas passage arranged from the first gas inlet 32 to the gas outlet 36 via the gap 24, and the second gas is fed from the second gas inlet 34 to a position in the first gas passage on the downstream side of the gap 24. The first gas and the second one, which have reacted with each other, are discharged from the gas outlet 36. When the first gas passes through the gap 24, a turbulent flow is caused in the first gas by the action of the fins 76 of the rotating body 74. Then the first gas is reacted or activated by the action of plasma 30 generated in the gap 24 by the plasma generating means 158, 160, and also by the action of the catalysts 26, 28. This activated first gas comes into contact with the second gas that has been introduced from the second gas inlet 34 and not passed in the gap 24. Then the activated first gas further reacts with the second gas. In this way, not only purifying of gas but also cracking of gas or synthetic reaction of gas can be effectively conducted.

Figure 22:
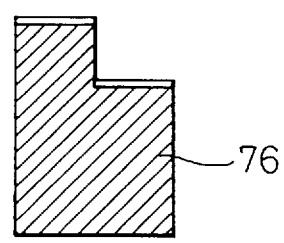
FIG. 22 is a view showing a variation of the fin.

The fins 76 of the rotating body 74 are formed so that they can be accommodated on a predetermined cylindrical surface. On the predetermined cylindrical surface, the shape of each fin can be changed. For example, the fins 76 of the rotating body 74 are deformed as illustrated by the arrow in FIG. 9. Specifically, point $P_1$ corresponding to the leading edge of each fin 76 in the rotational direction is arranged close to the metallic ring 78, and point $P_2$ corresponding to the trailing edge is arranged distant from the metallic ring 78. Points $P_1$ of all fins 76 are accommodated on one cylindrical surface. Accordingly, when plasma 30 is generated between each fin 76 and the metallic ring 78, plasma 30 is strongly generated in the small gap 24 at the first point $P_1$, and the thus generated plasma 30 continues at a large number of points which follow point $P_1$. FIG. 22 is a view of the fin 76, the section in the rotational direction of which is formed into a step-shape. The shape of the fin 76 is not limited to the above specific embodiment. It is possible to adopt a fin, the plane shape of which is not symmetrical in the transverse direction. Also, it is possible to adopt a fin, the length of which is different at least partially. Also, it is possible to adopt a fin, in which at least two of the above characteristics are combined. The number of fins 76 is at least one, that is, the number of fins 76 is not particularly limited.

FIG. 10 is a view showing an embodiment in which the magnetic layer 82 is interposed between the ring 80 made of insulating material and the inner circumferential wall 12i of the housing 12. When the magnetic layer 82 is arranged, the following advantages can be provided. For example, when a voltage of high-frequency of ECR (40.68 MHz) is impressed between the metallic ring 78 and the fin 76, plasma 30 of high electron density, the value of which is not less than $10^{20}/m^2$, is generated, so that gas such as $NO_X$ can be effectively cracked. The principle of generating plasma of high density can be explained by the effect of ECR (Electron Cyclotron Resonance) which is shown in FIGS. 11A to 11C. In FIG. 11A, when a voltage is impressed, plasma is generated at a substantially constant position. In FIG. 11B, electrons conduct a cyclotron motion by the action of a magnetic force. Due to the foregoing, the density of plasma is increased as shown in FIG. 11B.

Figure 13:
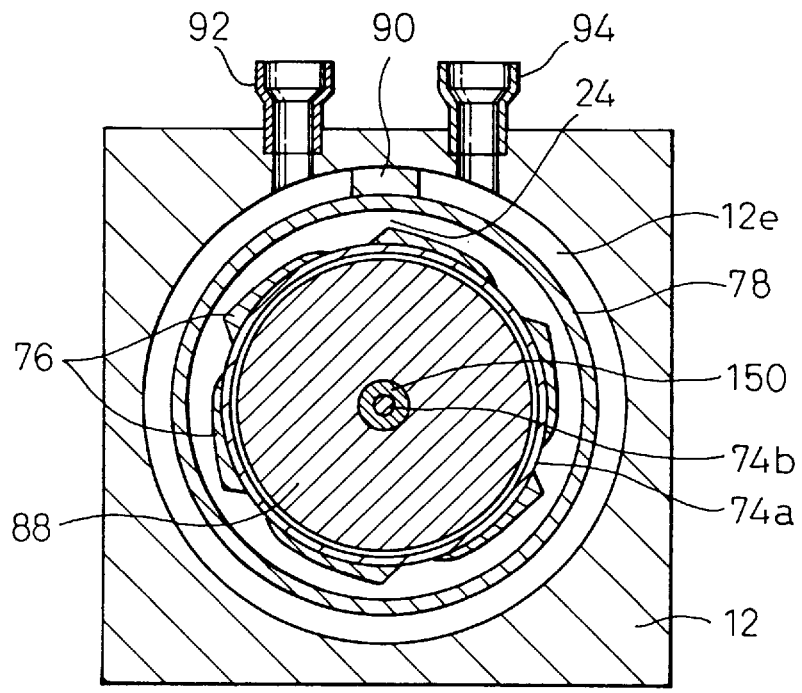
FIG. 13 is a cross-sectional view of the reactor taken on line XIII—XIII in FIG. 12.

FIGS. 12 and 13 are views showing the fifth embodiment of the present invention. In the arrangement shown in FIG. 12, the coil 154 (shown in FIG. 6) in the rotating body 74 is omitted. There is provided a substantially ring-shaped groove portion 12e between the inner circumferential surface of the housing 12 and the insulating ring 78. The housing 12 is made of Teflon which is a brand name. However, it is possible to use plastics, ceramics and metal, the surface of which is coated with insulating material. A protrusion 90 protrudes from a portion of this groove portion 12e, so that a C-shaped groove portion 12e is formed. There is provided a cooling water injection port 92 at one end of the C-shaped groove portion 12e. There is provided a cooling water discharge port 94 at the other end of the C-shaped groove portion 12e. Also, in this embodiment, there is provided a plasma generating means (not shown in the drawing) for generating plasma in the gap 24.

Plasma is generated in the minute gap 24 by the plasma generating means, and gas introduced into the housing 12 is purified when it passes through the minute gap 24. When cooling water is fed from the cooling water injection port 92, it flows on an outer surface of the metallic ring 78. Therefore, the entire metallic ring 78 is cooled in the circumferential direction. Under this condition in which the entire metallic ring 78 is cooled, gas is purified. Since the electrode of plasma is cooled in this way, it is possible to prevent a cracking reaction of plasma from being converted into a compound reaction.

Figure 14:
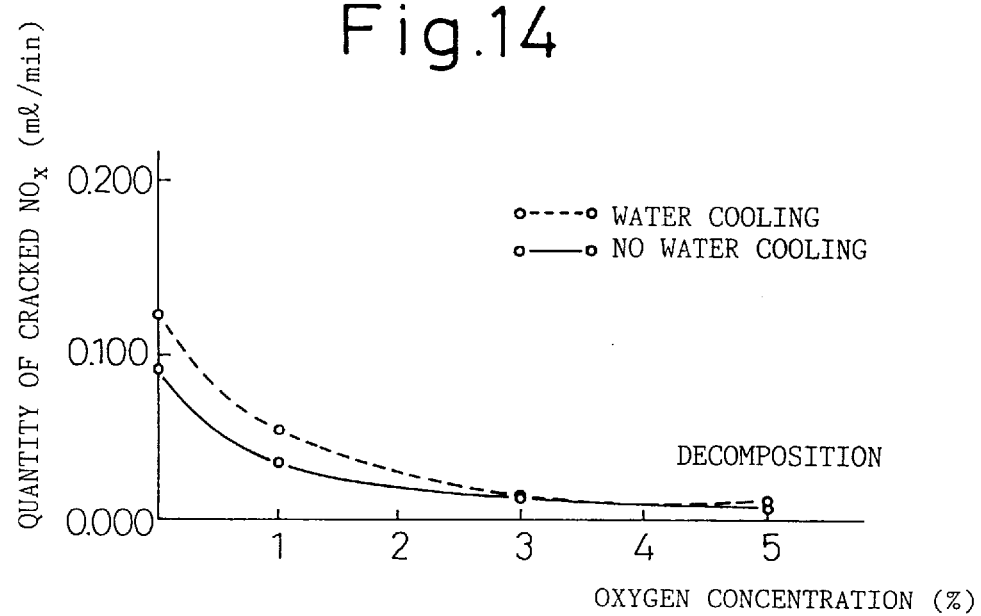
FIG. 14 is a graph showing a result of the test in which two cases were compared, one is a case in which water cooling was conducted and the other is a case in which cooling was not conducted.

In FIG. 14, the dotted line shows a reactivity of gas in the case where cooling water was made to flow in the groove portion 12e of the housing 12, and the solid line shows a reactivity of gas in the case where cooling water was not made to flow. Measurement was conducted in each case of oxygen concentration in the gas introduced into the first gas inlet when the oxygen concentration was 0, 1, 3 and 5%. When water cooling was conducted, a quantity of decomposed $NO_X$ was larger than that of a case in which water cooling was not conducted. This tendency was remarkable as the oxygen concentration decreased.

Figure 15:
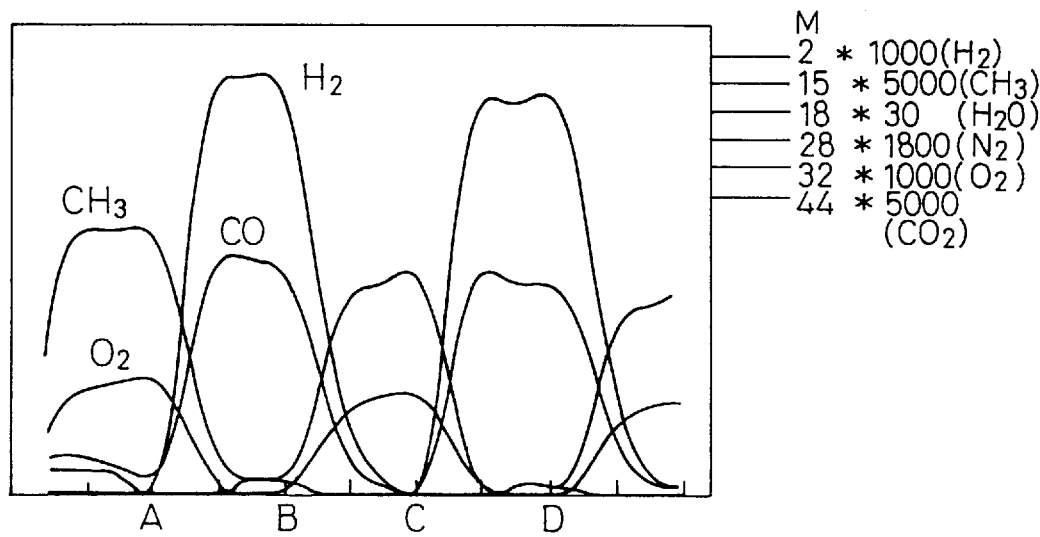
FIG. 15 is a view to explain a gas reaction.

FIG. 15 shows a result of measurement in which the reactivity of gas was measured in the following two cases. One is a case in which $O_2$ gas mixed with He was introduced from the first gas inlet at the flow rate of 100 cc/min, and the other is a case in which $CH_4$ gas mixed with He was introduced from the second gas inlet at the flow rate of 200 cc/min. Under the condition that the rotational speed of the rotating body 74 was 3000 rpm and the load voltage was 5.6 KVpeak-peak, plasma was generated in the minute gap (0.3 mm) between the inner surface of the housing and the rotational blades by the action of glow discharge. Concerning the measuring apparatus, a four-electrode mass spectrometer manufactured by Ulvac Co. was used. In FIG. 15, points A and C are points of time at which plasma was generated by the plasma generating means, and points B and D are points of time at which plasma was stopped. Due to the foregoing, it was made clear that the reaction of $2CH_4 + O_2 \rightarrow 2CO + 4H_2$ was advancing in the gas reactor of this embodiment. In FIG. 15, character M represents the mass number, and mark * represents the intensity (concentration).

FIGS. 17 to 21 are views showing the sixth embodiment of the present invention. The gas reactor 10 includes a housing 12. In the housing 12, there is formed a circular first gas inlet 32, and gas to be activated by the plasma and catalyst is made to flow into this gas inlet 32. In the housing 12, there is formed a gas outlet 36 which is provided on the end wall 12h. The second gas inlet (not shown) is provided in the same manner as that of the above embodiment. In the inner circumferential wall 12i of the housing 12, there is provided an insulating ring 80. Inside the insulating ring 80, there is provided a metallic ring 78 to be used as an electrode.

Figure 20:
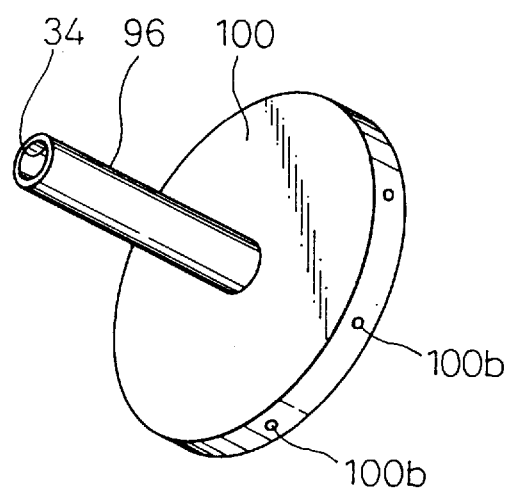
FIG. 20 is a perspective view of the gas feed member shown in FIG. 17.
Figure 21:
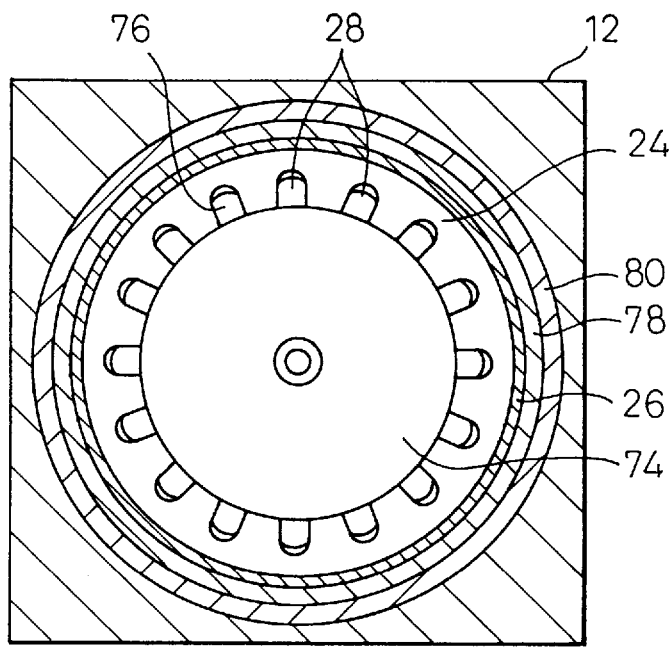
FIG. 21 is a cross-sectional view of the reactor taken on line XXI—XXI in FIG. 17.

The second gas inlet 34 is formed into a gas flow pipe 96 which extends in the axial direction at the center of the housing 12. As shown in FIG. 20, the gas flow pipe 96 is integrated with a hollow gas feed disk 100. The gas feed disk 100 is fixed onto the end wall 12h of the housing 12 by a support 102. The gas flow pipe 96 communicates with an inner space of the gas feed disk 100 in the hole 100a. On an outer circumference of the gas feed disk 100, there is formed a hole 100b. The gas flow pipe 96 extends penetrating the rotating body 74. The rotating body 74 is rotatably supported by the gas flow pipe 96 via the bearing 98. The rotating body 74 has fins 76, and catalyst layers 26, 28 are respectively held by the metallic ring 78 and the fins 76.

The gas feed disk 100 is arranged at a position behind the rotating body 74. The second gas is fed from the second gas inlet 34. Then the second gas flows out from the hole 100b and is mixed with the first gas activated on the downstream side of the gap 24. Accordingly, the action in this case is the same as the action in the above embodiment. In this connection, the rotating body 74 can be driven by a motor, however, the rotating body 74 may be driven by the pressure of introduced gas.

In the front of the rotating body 74, there is provided a conical gas flow changing member 74c. An outer diameter of this gas flow changing member 74c is gradually increased from the first gas inlet 32 side to the gas outlet 36 side. When the conical gas flow changing member 74c is attached to the rotating body 74 as described above, after gas has flowed from the first gas inlet 32 into the housing 12, the direction of gas flow is changed by the gas flow changing member 74c, so that the gas flow is directed toward the inner circumferential wall 12c (metallic layer ring 78) of the housing 12. Accordingly, gas can be positively fed into the minute gap 16 between the fins 76 and the inner wall 13 (metallic layer 50). Therefore, gas can be very effectively purified by the action of plasma.

In the above embodiment, the gas flow changing member 74c is conical, however, the shape of the gas flow changing member 74c is not limited to the specific embodiment. As long as the outer diameter of the gas flow changing member 74c is gradually increased in the direction of the flow of gas passing through the first gas inlet 32, any shapes may be adopted. Examples of usable shapes of the gas flow changing member are a triangular pyramid, rectangular pyramid, and conic trapezoid. The fins 76 of the rotating body 74 are preferably composed in such a manner that intervals between the fins 76 and the inner circumferential wall 12c (metallic ring 78) of the housing 12 can be maintained constant, that is, it is most preferable that the inner circumferential wall 12c is formed cylindrical. In addition to the above arrangement, when irregularities are formed on the inner circumferential wall, or when the inner circumferential wall is inclined, or when these arrangements are appropriately combined, the effect of purifying gas can be more enhanced.

Figure 23:
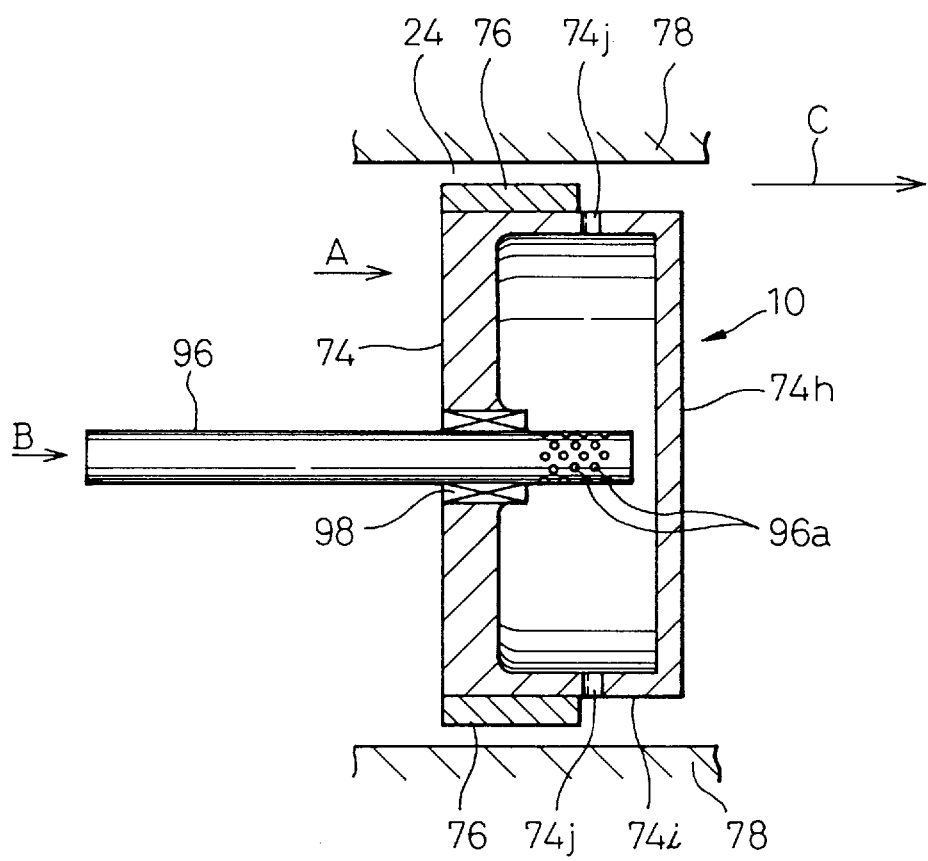
FIG. 23 is a cross-sectional view showing a gas reactor of the seventh embodiment of the present invention.

FIG. 23 is a view showing the seventh embodiment of the present invention. In this embodiment, the rotating body 74 is formed to be hollow and provided with a bottom portion 74h. On the annular wall 74i of the rotating body 74, there is formed a hole 74j. The gas flow pipe 96 is supported by an appropriate support means, and the rotating body 74 is rotatably supported by the gas flow pipe 96 via the bearing 98. At the end of the gas flow pipe 96, there are formed holes 96a which are open to the hollow portion of the rotating body 74. The rotating body 74 has fins 76, and the hole 74j of the rotating body 74 is formed on the downstream side of the fins 76. Accordingly, after the second gas has been fed from the second gas inlet 34 (the gas flow pipe 96), it flows out from the hole 74j and is mixed with the first gas which has been activated on the downstream side of the gap 24. Accordingly, the action in this case is the same as the action of the above embodiment.

Figure 24:
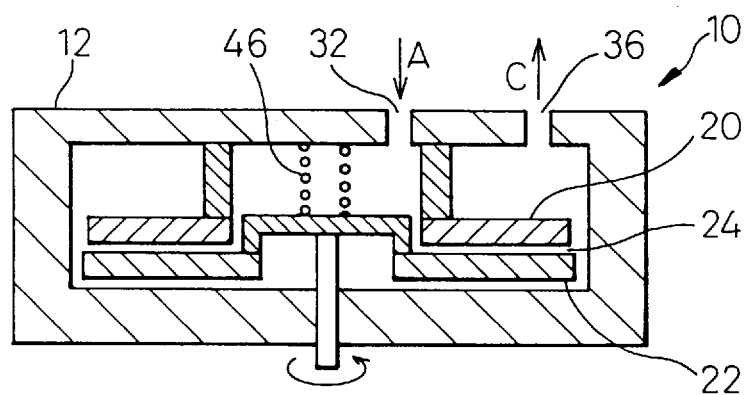
FIG. 24 is a cross-sectional view showing a gas reactor of the eighth embodiment of the present invention.
Figure 25:
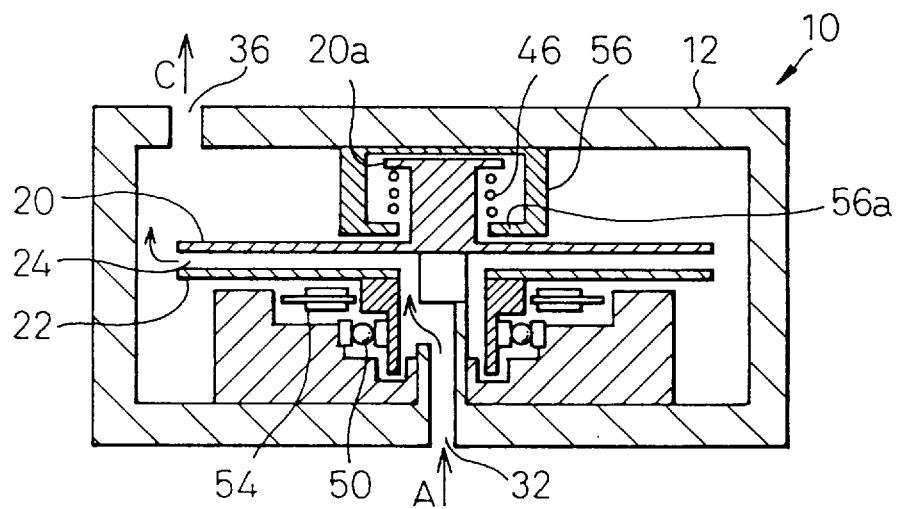
FIG. 25 is a cross-sectional view showing a gas reactor of the ninth embodiment of the present invention.

FIGS. 24 and 25 are views respectively showing the eighth embodiment and the ninth embodiment of the present invention. These embodiments are very similar to the embodiments shown in FIGS. 1 to 5 except that the second inlet is not provided.

In FIG. 24, the gas reactor 10 includes a housing 12, a rotatable plate 22 and a stationary plate 20. Both the rotatable plate 22 and the stationary plate 20 respectively hold catalyst layers 26, 28. Due to the foregoing arrangement, plasma can be generated by discharge in the gap 24 between the rotatable plate 22 and the stationary plate 20. There is provided a gas inlet at the center of the end wall of the housing 12, and also there is provided a gas outlet 36 in the periphery of the end wall of the housing 12. Accordingly, also in this case, gas can be effectively purified or reacted by the catalyst action and the plasma action and also by the action of a turbulent flow caused by the rotatable plate 22.

In FIG. 25, the gas reactor 10 includes a housing 12, a rotatable plate 22 and a stationary plate 20. Both the rotatable plate 22 and the stationary plate 20 respectively hold catalyst layers 26, 28. Due to the foregoing arrangement, plasma can be generated by glow discharge in the gap 24 between the rotatable plate 22 and the stationary plate 20. There is provided a gas inlet on one end wall of the housing 12, and also there is provided a gas outlet 36 on the other end wall of the housing 12.

Figure 26:
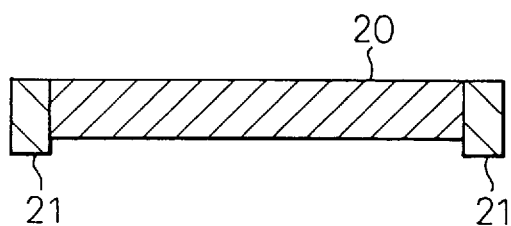
FIG. 26 is a view showing a variation of the plate.

FIG. 26 is a view showing an example in which an insulating flotation slider 21 is attached to the stationary plate 20 (or the rotatable plate 22) in the arrangement shown in FIGS. 24 and 25. At first, the flotation slider 21 comes into contact with the rotatable plate 22. When the rotatable plate 22 starts rotating, it floats from the rotatable plate 22 by the action of a wind caused by the rotation. Therefore, the gap 24 is very small at first, so that plasma can be easily generated by glow discharge, and then an appropriate gap can be maintained to keep the generation of plasma.

Figure 27:
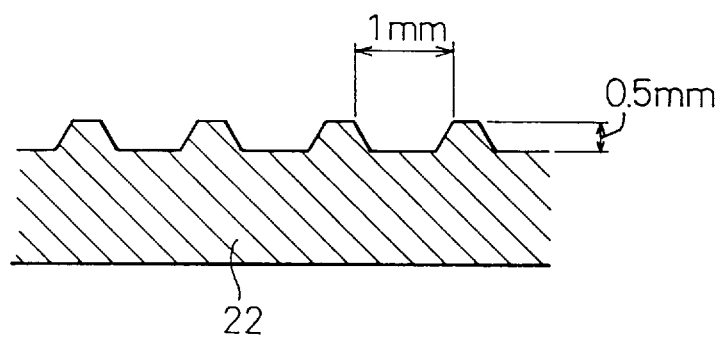
FIG. 27 is a view showing a variation of the plate.
Figure 28:
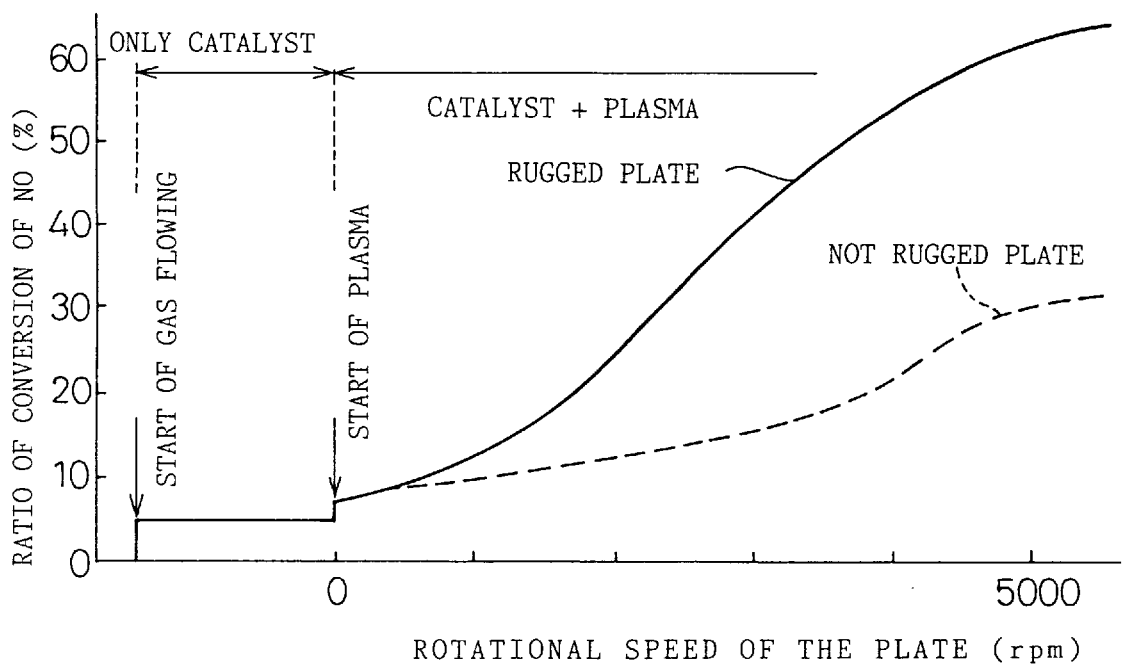
FIG. 28 is a view showing a relation between the rotational speed of the plate and the conversion ratio of NO.

FIG. 27 is a view showing an example in which the surface of the rotatable plate 22 (or the stationary plate 20) is made ridged in the arrangement shown in FIGS. 24 and 25. For example, the stationary plate 20 was a disk made of stainless steel, the diameter of which was 90 mm, and the thickness of which was 5 mm. Also, the rotatable plate 22 was a disk made of stainless steel, the diameter of which was 90 mm, and the thickness of which was 5 mm. In this case, two types of plates were prepared or roughened. One is a plate, the surface of which was made roughened, and the other is a plate, the surface of which was not made rugged. In order to make the surface of a plate to be rugged, grooves, the width of which was 1 mm, and the depth of which was 0.5 mm, were formed. On the surfaces of the stationary plate 20 and the rotatable plate 22, catalyst layers of rhodium, the thickness of which was 2 $\mu$m, were provided by means of electric plating. While the gap 24 was maintained at 0.3 mm, air (treatment gas) containing NO gas by 240 ppm was fed into the housing 12 under the condition that the flow rate was 500 cc/min and the pressure was 1.02 atm. Then, an alternating voltage of about 3.5 kV and 50 kHz was impressed between the rotatable plate 22 and the stationary plate 20, and the rotatable plate 22 was rotated. In this way, cracking reaction was conducted on NO gas so as to provide the synergistic effect of plasma and catalyst. When the gas obtained at the outlet was analyzed, the result shown in FIG. 28 was obtained.

In the experiment shown on this graph, voltage was not impressed and rotation was not conducted until a predetermined period of time had passed from the start of feeding gas. After the predetermined period time had passed, voltage was impressed and rotation was conducted. Accordingly, at first, only the catalyst acted, and the gas purifying efficiency, that is, the NO conversion ratio was approximately 5%. When the impression of voltage and the rotation of the plate were started, the catalyst and plasma started their actions, and the gas purifying efficiency, that is, NO conversion ratio was remarkably enhanced. After the start of the impression of voltage and the rotation of the plate, a difference was caused between the example in which the plate surface was made rugged and the example in which the plate surface was not made rugged, in accordance with an increase in the rotational speed. When the rotational speed exceeded 500 rpm, an apparent effect was provided by the example in which the plate surface was made rugged. The cracking efficiency of the example in which the rugged plate was used was approximately twice as high as that of the example in which the rugged plate was not used. When the plate, the surface of which was made rugged, was rotated at about 5000 rpm, a high NO cracking ratio of 60% was obtained.

We claim:

1. A gas reactor comprising:
   a housing;
   a first member arranged in the housing;
   a second member arranged opposed to the first member so as to form a gap between the first member and the second member;

a catalyst carried by at least one of the first member and the second member;

a plasma generating means for forming a plasma in the gap between the first member and the second member;

a first gas passage communicating from a first gas inlet provided in the housing to a gas outlet via the gap;

and a second gas inlet provided in the housing for flowing gas to a position on the downstream side of the gap in the first gas passage.

2. The gas reactor according to claim 1, wherein the first member is rotatably arranged and the second member is stationarily arranged.

3. The gas reactor according to claim 2, wherein the first member comprises a substantially flat rotatable plate, the second member comprises a substantially flat stationary plate, and the rotatable plate and the stationary plate are opposed to each other so as to form said gap between them.

4. The gas reactor according to claim 3, wherein the housing comprises a conductive portion and an insulating portion, the stationary plate is attached to the housing via the insulating portion, the stationary plate is provided with a terminal connected to one side of a power supply for generating plasma, and the rotatable plate is attached to the conductive portion of the housing so that the rotatable plate is connected to the other side of the power supply via the conductive portion.

5. The gas reactor according to claim 4, wherein the insulating portion comprises a cylindrical sleeve having a cup-shaped cylindrical cross-section, a middle portion of the cup-shaped cylindrical sleeve is attached to the housing, and a leg portion of the cup-shaped cylindrical sleeve is attached to the stationary plate.

6. The gas reactor according to claim 4, wherein the cylindrical sleeve divides an internal space of the housing into a central chamber inside the cylindrical sleeve and a peripheral chamber outside the cylindrical sleeve, said first inlet is provided in the cylindrical sleeve, said gas outlet is provided in the housing at a position close to the cylindrical sleeve, and the first gas passage is communicated from the first gas inlet to the gas outlet via the central chamber, said gap and the peripheral chamber.

7. The gas reactor according to claim 6, wherein the second gas inlet is provided in the housing at a position close to said gap.

8. The gas reactor according to claim 3, wherein the housing comprises an annular wall, and first and second end walls connected to both sides of the annular wall, the rotatable member is rotatably supported by a support means extending from the second end wall, and said opposing member is supported by an insulating support means extending from the first end wall.

9. The gas reactor according to claim 8, wherein the rotatable member has a hollow hub portion, the support means for supporting the rotatable portion is a bearing to rotatably support the hollow portion of the hub, a shaft extending inside the hollow hub portion is fixed to the second end wall, and the insulating support means of the opposing member is engaged with the shaft.

10. The gas reactor according to claim 9, wherein the shaft has a screw hole, the insulating support means of the opposing member has a screw engageable with the screw hole, so that a gap between the rotatable member and the opposing member can be adjusted.

11. The gas reactor according to claim 10, wherein the opposing member is urged by a spring with respect to the housing or a portion fixed to the housing.

12. The gas reactor according to claim 11, wherein the insulating support means for supporting the opposing member comprises a cylindrical sleeve having a cup-shaped cross-section, engaged with a hole formed in the first end wall of the housing, the first gas inlet is provided in the cylindrical sleeve, the gas outlet is provided in the first end wall around the cylindrical sleeve, and the second gas inlet is provided in the annular wall of the housing.

13. The gas reactor according to claim 11, wherein the shaft extending inside the hollow hub portion is hollow, the first gas inlet is provided in the hollow shaft, the gas outlet is provided in the first end wall, and the second gas inlet is provided in the annular wall of the housing.

14. The gas reactor according to claim 3, further comprising a drive means for driving the rotatable member.

15. The gas reactor according to claim 3, further comprising an adjusting means for adjusting the gap between the rotatable member and the opposing member, by detecting a state of reaction in the gas reactor.

16. The gas reactor according to claim 2, wherein the housing has an inner circumferential wall, the second member comprises an annular stationary member arranged in the inner circumferential wall of the housing, the first member comprises a rotating body having fins on the periphery thereof, and the stationary member and the fins of the rotating body are opposed to each other so as to form said gap between them.

17. The gas reactor according to claim 16, wherein the housing is made of conductive material, the annular stationary member is attached to the inner circumferential wall of the housing via a layer of insulating material, the annular stationary member has a terminal connected to one of the terminals of a power supply to generate plasma, and the rotating body is connected to the other terminal of the power supply via the housing.

18. The gas reactor according to claim 16, wherein the housing has an annular wall, an end wall located on one side of the annular wall and an opening located on the other end side of the end wall, the first gas inlet comprises the opening on the other end side of the end wall, the gas outlet is provided on the end wall, and the second gas inlet is provided on the annular wall.

19. The gas reactor according to claim 16, wherein the housing has an annular wall, an end wall located on one side of the annular wall and an opening located on the other end side of the end wall, the rotating body is rotatably supported by a hollow shaft, the first gas inlet comprises an opening on the other end side, the gas outlet is provided in the end wall, and the second gas inlet is provided in the hollow shaft.

20. The gas reactor according to claim 19, wherein the rotating body has a gas flow changing member is arranged at a position on the upstream side of the gap in the first gas passage for changing a gas flow to the outside.

21. The gas reactor according to claim 20, wherein the gas flow changing member is formed in a cone shape.

22. The gas reactor according to claim 16, wherein the inner circumferential wall of the housing is formed in a cylindrical shape, and the overall outer shape of the fins of the rotating body is formed in a shape to be accommodated in a predetermined cylindrical surface.

23. The gas reactor according to claim 22, wherein the outer edges of the fins vary in shape.

24. The gas reactor according to claim 16, wherein an inner wall of the housing has irregularities.

25. The gas reactor according to claim 16, wherein an inner circumferential wall of the housing is inclined.

26. The gas reactor according to claim 16, wherein a magnetic layer is provided outside the annular stationary member.

27. The gas reactor according to claim 16, wherein the rotating body is capable of being rotated by the pressure of gas flowing in the first gas passage.

28. The gas reactor according to claim 16, further comprising a drive means for driving the rotatable member.

29. The gas reactor according to claim 16, wherein the housing includes a cooling means.

30. A gas reactor comprising:

a housing;

a substantially flat rotatable plate arranged in the housing;

a substantially flat stationary plate arranged opposed to the rotatable plate so that a gap is formed between the rotatable plate and the stationary plate;

a catalyst carried by at least one of the rotatable plate and the stationary plate;

a plasma generating means for forming a plasma in the gap between the rotatable plate and the stationary plate;

a gas inlet provided in the housing;

a gas outlet provided in the housing;

and a gas passage communicating from the gas inlet to the gas outlet via the gap.

31. The gas reactor according to claim 30, wherein the housing comprises a conductive portion and an insulating portion, the stationary plate is attached to the housing via the insulating portion, the stationary plate is provided with a terminal connected to one of the terminals of a power source for generating plasma, and the rotatable plate is attached to the conductive portion and connected to the other terminal of the power supply via the conductive portion.

32. The gas reactor according to claim 30, wherein the housing comprises an annular wall and first and second end walls connected to both sides of the annular wall, an insulating cylindrical sleeve having a Π-shape cross-section is engaged in a hole formed in the first end wall, a middle portion of the Π-shaped cylindrical sleeve is attached to the housing, a leg portion of the Π-shaped cylindrical sleeve is attached to the stationary plate, and the rotatable plate is rotatably supported by a support means extending from the second end wall.

33. The gas reactor according to claim 32, wherein the cylindrical sleeve divides an internal space of the housing into a central chamber inside the cylindrical sleeve and a peripheral chamber outside the cylindrical sleeve, the gas inlet is provided in the cylindrical sleeve, the gas outlet is provided in the housing at a position adjacent to the cylindrical sleeve, and the gas passage is communicated from the gas inlet to the gas outlet via the central chamber, the gap and the peripheral chamber.

34. The gas reactor according to claim 33, wherein the rotatable member has a hollow hub portion, the support means for supporting the rotatable portion is a bearing to rotatably support the hollow portion, a shaft extending inside the hollow hub portion is fixed to the second end wall, and the cylindrical sleeve is engaged with the shaft.

35. The gas reactor according to claim 33, wherein the shaft has a screw hole, the support means for supporting the stationary plate has a screw engageable with the screw hole, so that said gap between the rotating body and the stationary plate can be adjusted.

36. The gas reactor according to claim 34, wherein the stationary plate is urged by a spring with respect to the housing or a portion fixed to the housing.

37. The gas reactor according to claim 33, wherein the shaft extending inside the hollow hub portion is hollow, the gas inlet is provided in the hollow shaft, and the gas outlet is provided in the first end wall.

38. The gas reactor according to claim 30 further comprising a drive means for driving the rotatable member.

39. The gas reactor according to claim 30, further comprising an adjusting means for adjusting the gap between the rotatable member and the opposing member, by detecting a state of reaction in the gas reactor.

40. A method of reacting gas comprising the steps of:

arranging a first member and a second member in a housing so that a gap is formed between them, a catalyst being carried by at least one of the first member and the second member;

generating plasma in the gap between the first member and the second one;

letting a first gas flow from a first gas inlet provided in the housing into a first gas passage communicating with a gas outlet via the gap, so that the first gas can be activated by the catalyst and plasma;

and letting a first gas flow from a second gas inlet provided in the housing to the first gas passage at a position on the downstream side of the gap, so that the activated first gas can be reacted with the second gas.

* * * * *

UNITED STATES PATENT AND TRADEMARK OFFICE
CERTIFICATE OF CORRECTION

PATENT NO.:    5,817,218
DATED     :    Oct. 6, 1998
INVENTOR(S):   HAYASHI et al.

It is certified that error appears in the above-identified patent and that said Letters Patent is hereby corrected as shown below:

Title page, add the name of a second assignee under [73] as follows:

HOKUSHIN CORPORATION, Kanagawa, Japan

Signed and Sealed this

Twenty-ninth Day of August, 2000

Attest:

Q. TODD DICKINSON

*Attesting Officer*      *Director of Patents and Trademarks*